(12) United States Patent
Whittaker

(10) Patent No.: US 6,254,769 B1
(45) Date of Patent: Jul. 3, 2001

(54) AQUARIUM MAINTENANCE SYSTEM

(76) Inventor: Ryan S. Whittaker, 1909 Princess Ct., Naples, FL (US) 34110-6018

( * ) Notice: Subject to any disclaimer, the term of this patent is extended or adjusted under 35 U.S.C. 154(b) by 0 days.

(21) Appl. No.: 09/442,268

(22) Filed: Nov. 17, 1999

(51) Int. Cl.[7] ............................ B01D 27/02; A01K 63/04; F16L 37/08
(52) U.S. Cl. .............................. 210/95; 210/94; 210/169; 210/232; 210/196; 210/195.1; 210/258; 210/282; 210/416.2; 119/226; 119/259; 285/33
(58) Field of Search .................... 210/94, 95, 130, 210/167, 169, 194, 195.1, 232, 237, 238, 254, 258, 282, 409, 411, 416.2, 470, 433.1, 196; 119/259, 226, 227; 285/33, 304

(56) References Cited

U.S. PATENT DOCUMENTS

| 881,488 | * | 3/1908 | Rochow . |
|---|---|---|---|
| 2,476,172 | * | 7/1949 | Williams . |
| 2,701,147 | * | 2/1955 | Summerville . |
| 3,116,712 | * | 1/1964 | Ogden et al. . |
| 3,324,829 | * | 6/1967 | De Jose et al. . |
| 3,540,592 | * | 11/1970 | Derreumaux . |
| 3,785,342 | * | 1/1974 | Rogers . |
| 4,113,616 | * | 9/1978 | Kaes . |
| 5,083,587 | * | 1/1992 | Tarjan . |
| 5,279,748 | * | 1/1994 | Hackett . |
| 5,560,318 | * | 10/1996 | Yoshida et al. . |
| 5,662,800 | * | 9/1997 | Sugiura . |
| 5,728,293 | * | 3/1998 | Guoli et al. . |
| 5,866,018 | * | 2/1999 | Hyde et al. . |

* cited by examiner

Primary Examiner—Joseph W. Drodge
Assistant Examiner—Terry K. Cecil

(57) ABSTRACT

An aquarium-maintenance system has a transparent filtering canister (1) with quick-joint inlet attachment (3) and quick-joint outlet attachment (8) to transparent aquarium tubing (5, 13) together with a handle (14) to allow quick, convenient and clean replacement and/or back-flow cleaning of filtering members (11). A system pump (12) has variable output capacity for filtered water circulation and optionally for aquarium flushing with a cannister bypass (19), discharge conveyance (21) to a drain-water disposer (22), refill conveyance (24) from a refill-water source (23) and back-flow conveyance (16) from a wash-water source (17). This is a comprehensive aquarium-maintenance system that is adaptable totally or in part to all sizes and types of aquariums (6).

6 Claims, 4 Drawing Sheets

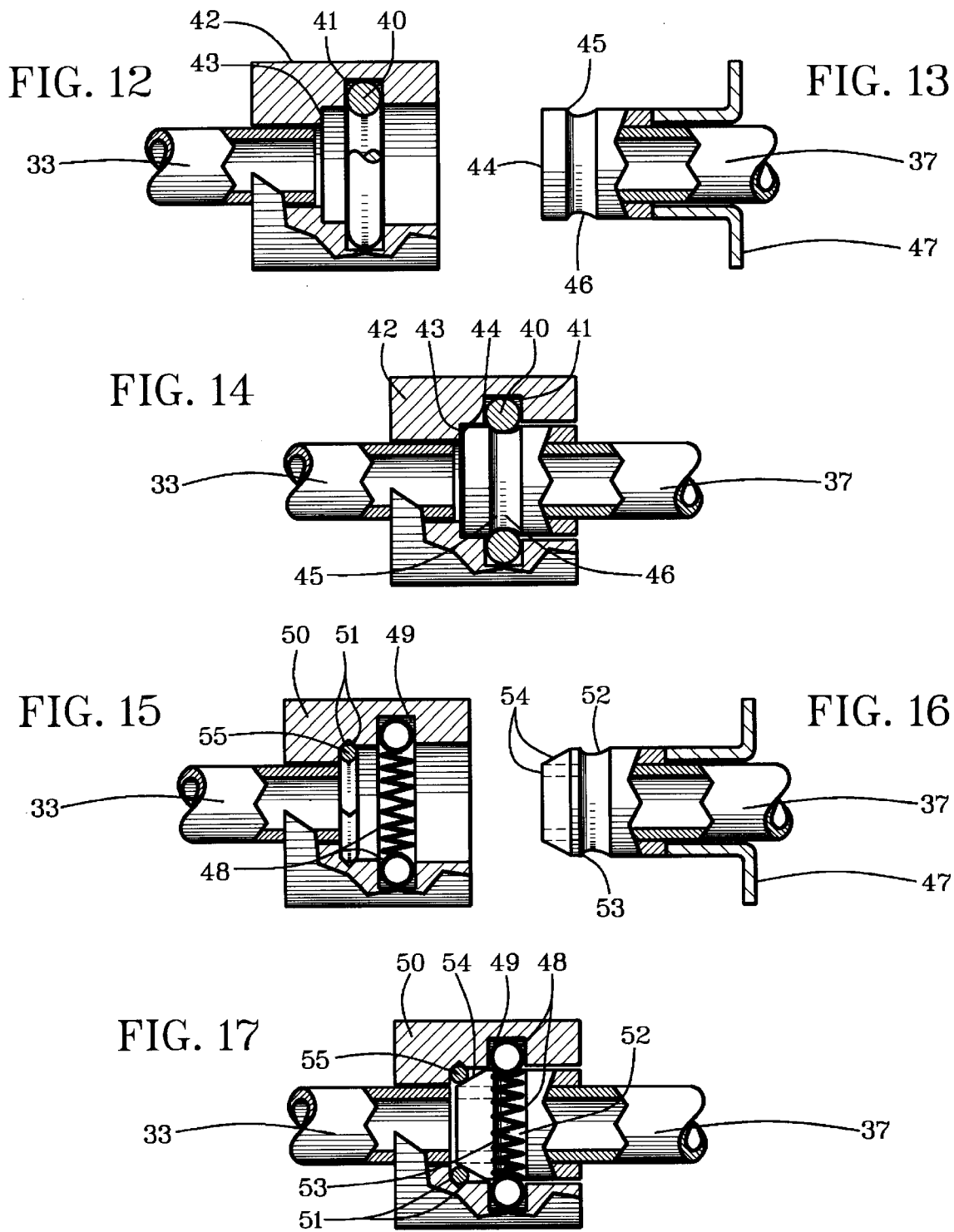

AQUARIUM MAINTENANCE SYSTEM

1. FIELD OF THE INVENTION

This invention relates to cleaning aquarium water and aquariums by removal of contaminants and objectionable material quickly, easily and without making a mess.

2. RELATION TO PRIOR ART

Keeping aquarium water and aquariums clean has long been and remains a major burden for aquarists. Consequently, there are numerous known aquarium-maintenance devices, systems and methods, but none having the convenience, ease and cleanliness of operation made possible with this invention.

An example of a known related but different aquarium-maintenance system is described in U.S. Pat. No. 5,866,018, issued to Hyde et al on Feb. 2, 1999. Hyde et al taught a vortex aquarium filter which flung particulate in fluid outward radially with vorticity against a cylindrical wall where it became sludge which gravitated down to a tapped outlet. Slightly cleaner and easier to use than some, it still required messy and tedious disposal of aquarium particulate that was flung off and collected. Also known are throwaway filters, reverse-flow cleanable filters, screen filters and other filters that are not part of an aquarium-maintenance system as taught by this invention.

SUMMARY OF THE INVENTION

Objects of patentable novelty and utility taught by this invention are to provide an aquarium-maintenance system which:

cleans most known aquarium filter components easier, faster and cleaner;

provides visual display of cleanliness of aquarium water en route to, from and in a filter; and flushes aquariums selectively and optionally in combination with filter cleaning.

This invention accomplishes these and other objectives with an aquarium-maintenance system having a transparent filtering canister with quick-joint inlet attachment and quick-joint outlet attachment to transparent aquarium tubing, together with a handle to allow quick, convenient and clean replacement and/or back-flow cleaning of filtering members. A system pump has variable output capacity for filtered water circulation and optionally for aquarium flushing with a cannister bypass, valved conveyance to a drain-water disposer, valved conveyance from a refill-water source and valved conveyance from a wash-water source. This is a comprehensive aquarium-maintenance system that is adaptable totally or in part to all sizes and types of aquariums.

BRIEF DESCRIPTION OF DRAWINGS

This invention is described by appended claims in relation to description of a preferred embodiment with reference to the following drawings which are explained briefly as follows:

FIG. 12 is a partially cutaway side view of an O-ring sleeve to which the first tube is leakproof-affixed for an O-ring-snap-on release;

FIG. 13 is a partially cutaway side view of the second tube with a pressurization groove for a grasping-seal O-ring for the O-ring-snap-on release;

FIG. 14 is a partially cutaway side view of the first tube joined to the second tube with the O-ring-snap-on release;

FIG. 15 is a partially cutaway side view of an O-ring sleeve to which the first tube is leakproof-affixed for a side-spring-snap-on release;

FIG. 16 is a partially cutaway side view of the second tube with a spring-pressure groove for a side-pressure coil spring for the side-spring-snap-on release; and FIG. 17 is a partially cutaway side view of the first tube joined to the second tube with the side-spring-snap-on release.

DESCRIPTION OF PREFERRED EMBODIMENT

Listed numerically below with reference to the drawings are terms used to describe features of this invention. These terms and numbers assigned to them designate the same features throughout this description.

Figure 1:
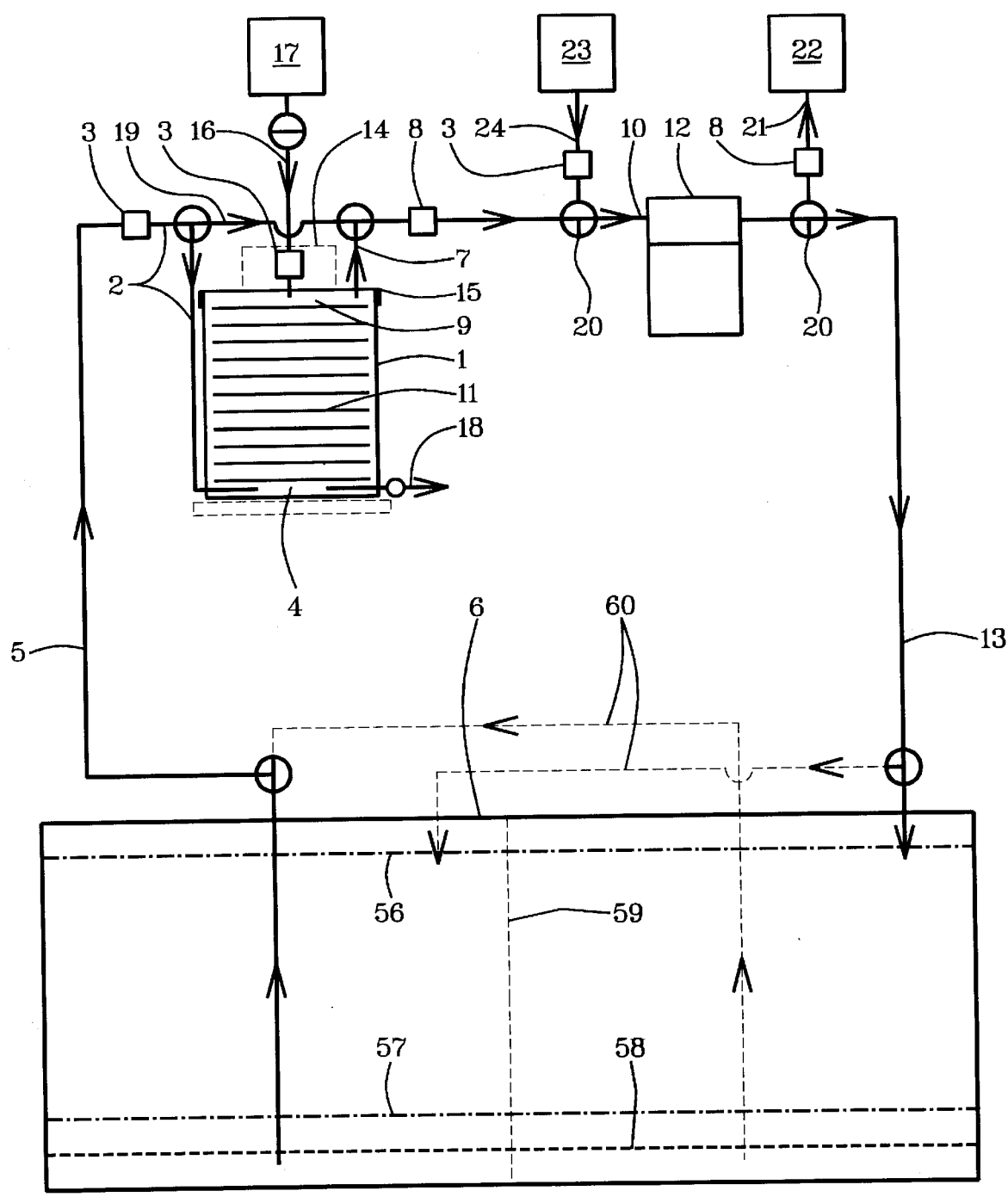
FIG. 1 is schematic diagram of the total aquarium-maintenance system.
Figure 2:
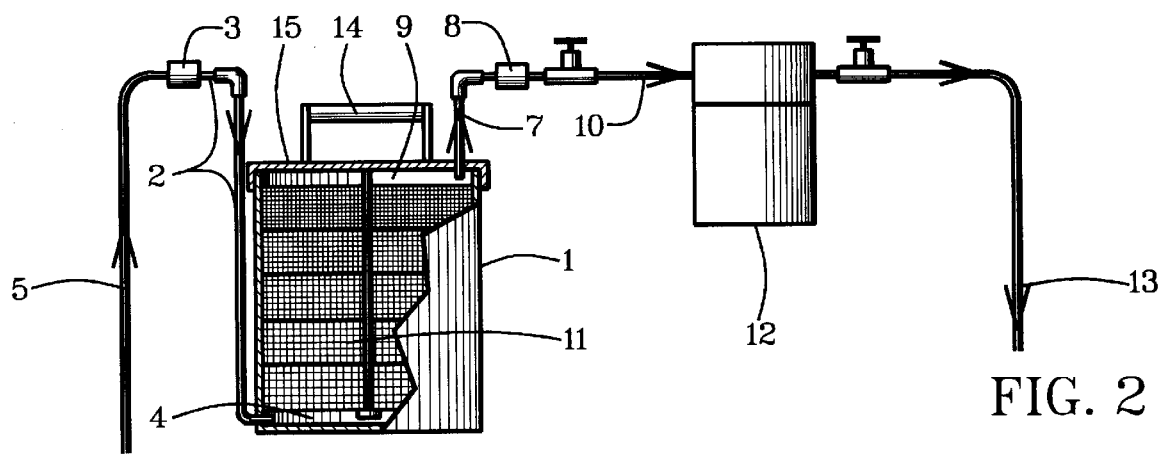
FIG. 2 is a partially cutaway side view of a vertical filtering cannister having a screw-on lid.
Figure 3:
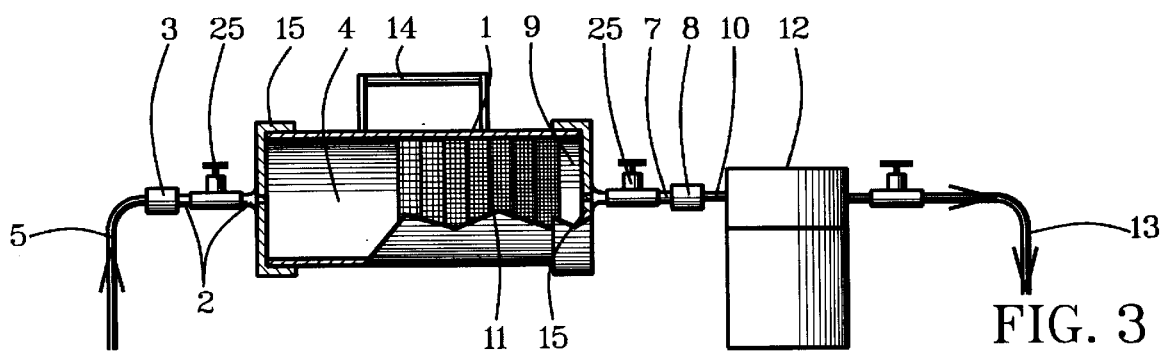
FIG. 3 is a partially cutaway side view of a horizontal filtering cannister having at least one screw-on or snap-on lid between inlet and outlet conveyances.
Figure 4:
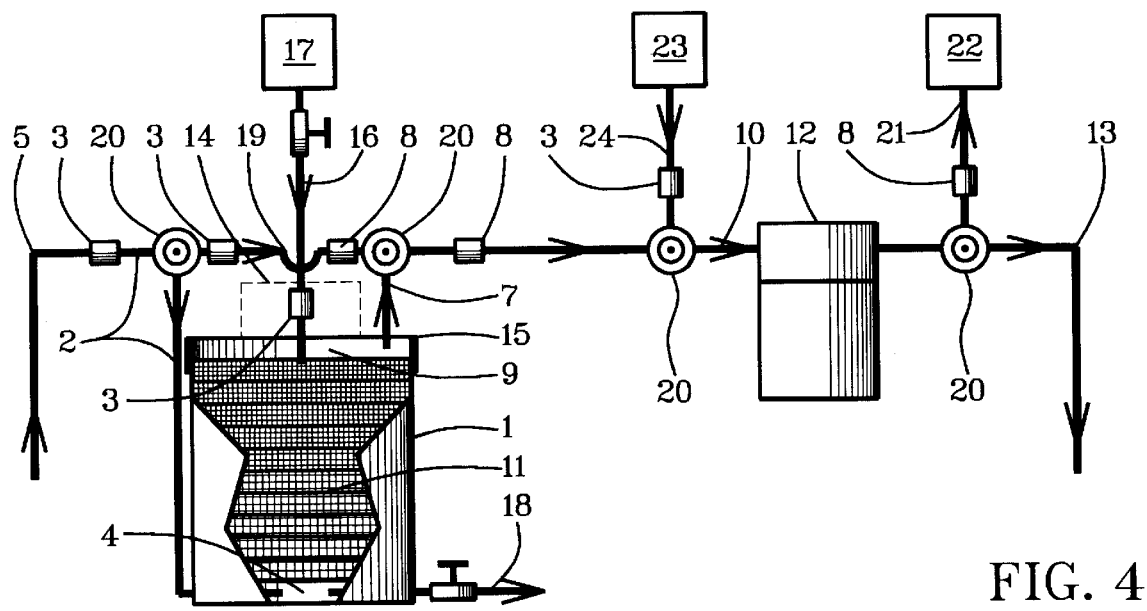
FIG. 4 is a partially cutaway side view of a back-flow filter cleaner having filter bypass for aquarium flushing with a valved waste discharge and a valved refill.
Figure 5:
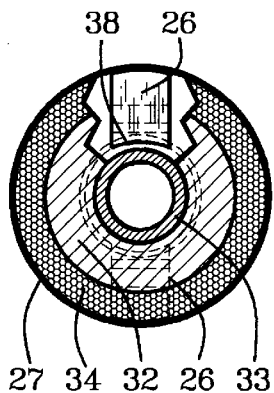
FIG. 5 is a partially cutaway first-tube end view of a tubular inlet connection or optionally an outlet connection having a squeeze-release.
Figure 6:
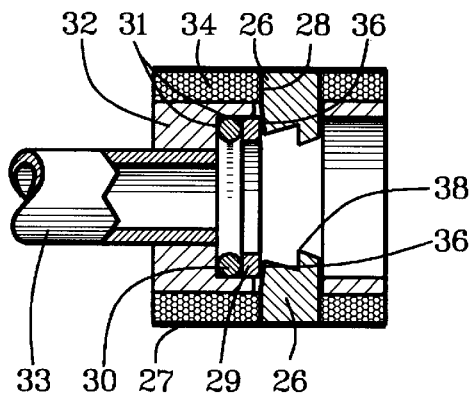
FIG. 6 is a partially cutaway side view of the squeeze-release to which the first tube is leakproof-affixed.
Figure 7:
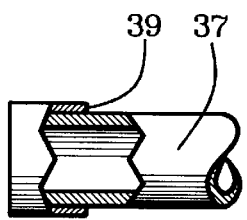
FIG. 7 is a partially cutaway side view of a second tube.
Figures 8, 9:
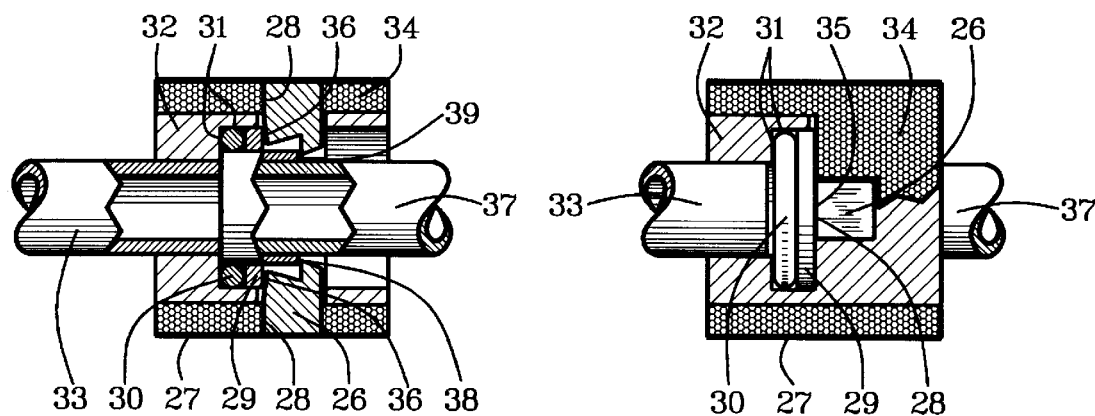
FIG. 8 is a partially cutaway side view of the first tube joined to the second tube with the squeeze release shown from a side of bevel rods.
FIG. 9 is a partially cutaway side view of the first tube joined to the second tube with the squeeze release shown from a top of a bevel rod.
Figures 10, 11:
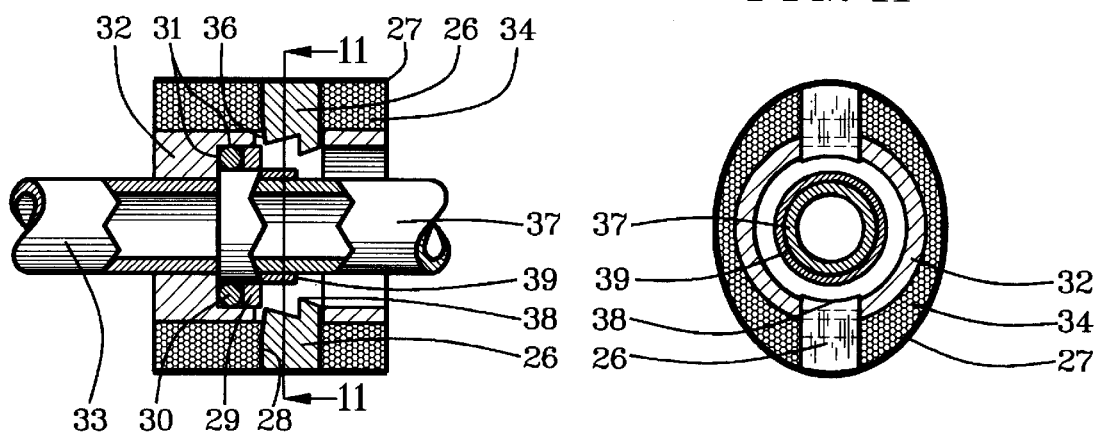
FIG. 10 is a partially cutaway side view of a squeeze-release in squeezed mode for release of the first tube from the second tube with the squeeze-release shown from a side of bevel rods.
FIG. 11 is a cross section of FIG. 10 through section line 11—11 from a second-tube end view of the squeeze-release in squeezed mode for release of the second tube.

1. Filtering cannister
2. Cannister-inlet conveyance
3. Quick-joint inlet attachment
4. Filter-inlet portion
5. Drain conveyance
6. Aquarium
7. Cannister-outlet conveyance
8. Quick-joint outlet attachment
9. Filter-outlet portion
10. Circulator conveyance
11. Filtering members
12. System pump
13. Fill conveyance
14. Handle
15. Lid
16. Back-flow inlet-valved conveyance
17. Wash-water source
18. Discharge outlet-valved conveyance
19. Cannister bypass 20. Three-way valving
21. Discharge conveyance
22. Drain-water disposer
23. Refill-water source
24. Refill conveyance
25. Shutoff valve
26. Bevel rods
27. Spring cylinder
28. Ring-side walls
29. Ring washer
30. Washer-backed O-ring
31. Sealing perimeter
32. Base cylinder
33. First tube
34. Resilient tube
35. Radial slide walls
36. Bevels
37. Second tube
38. Ratchet ends
39. Retainment surface
40. Grasping-seal O-ring
41. O-ring-sleeve groove
42. O-ring sleeve
43. End-sealing perimeter
44. Sealing surface
45. Seal-pressurization side
46. Pressurization groove
47. Tube-handle member
48. Side-pressure coil spring
49. Side-spring groove
50. Side-spring sleeve
51. O-ring-sealing perimeter
52. Spring-pressure groove
53. Pressurization wall
54. Sealing end
55. Spring-pressured O-ring
56. Full level
57. Flush level
58. Aquarium contents
59. Removable barrier
60. Supplemental conveyances Reference is made first to FIGS. 1–4. An aquarium-maintenance system has a filtering cannister 1 that is transparent or at least partly transparent for visual observation of cleanness of aquarium water and filtering medium inside of it. The filtering cannister 1 can be oriented vertically as depicted in FIGS. 1–2 and 4 or horizontal as depicted in FIG. 3.

A cannister-inlet conveyance 2 has a quick-joint inlet attachment 3 in fluid communication intermediate a filter-inlet portion 4 and a drain conveyance 5 that is at least partly transparent and fluid communicative from at least one aquarium 6. A cannister-outlet conveyance 7 has a quick-joint outlet attachment 8 that is fluid communicative intermediate a filter-outlet portion 9 and a circulator conveyance 10.

Filtering members 11 are positioned in a filter portion intermediate the filter-inlet portion 4 and the filter-outlet portion 9. Preferably, but not necessarily, the filtering members, whether oriented vertically or horizontally, are arranged with increasing fineness of filtering apertures in a direction of the filter-outlet portion 9 as depicted in FIGS. 2–4.

A system pump 12 having predetermined pumping capacity and controllable variation of output is in fluid communication intermediate the circulator conveyance 10 and a fill conveyance 13 that is at least partly transparent and fluid communicative to the aquarium 6.

At least one handling member such as a handle 14 is positioned for handling the filtering cannister 1 as appropriate for accessing and/or operating a filtering cleaner such as a lid 15 that can be screwed on or snapped on for quick and convenient replacement and/or cleaning of the filtering members 11. The handle 14 can be employed to lift either the filtering cannister 1 or only the lid 15 of vertically oriented filtering cannisters 1.

A filtering cleaner on the filtering cannister 1 includes optional combinations of features for either in-place cleaning with back-flow wash water, replacement, or removal for cleaning and reuse. As illustrated in FIGS. 1 and 4, in-place cleaning with back-wash water is accomplished with a back-flow inlet-valved conveyance 16 of back-flow wash water from a wash-water source 17 from which the wash water is directed into a top, such as the lid 15, of the filtering canister 1 which has a discharge outlet-valved conveyance 18 of discharge water from a bottom of the filtering cannister 1. The quick-joint inlet attachment 3 and the handle 14 shown make occasional replacement of filtering members 11 quick and convenient.

As depicted in FIGS. 2–3, replacement or removal for cleaning and reuse of the filtering members 11 is accomplished with quick disconnect and quick reconnect of the cannister-inlet conveyance 2 and of the cannister-outlet conveyance 7 with the quick-joint inlet attachment 3 and the quick-joint outlet attachment 8 for removal and replacement of the lid 15.

As depicted in FIGS. 1 and 4 for back-wash filter cleaning, this aquarium-maintenance system includes a filtering cleaner with optional flushing of the aquarium 6. For flushing the aquarium 6, a cannister bypass 19 is connected to the cannister-inlet conveyance 2 and to the cannister-outlet conveyance 7 for bypassing the filtering cannister 1. The quick-joint inlet attachment 3 and the quick-joint outlet attachment 8 can be used for filtering cannisters 1 having or not having three-way valving 20 at the filtering cannister 1.

Aquarium water bypassing the filtering cannister is discharged through a discharge conveyance 21 for discharge of aquarium drain water to a drain-water disposer 22. Water from a refill-water source 23 is supplied through a refill conveyance 24. The discharge conveyance 21 is downstream fluidly from the system pump 12 and the refill conveyance 24 is upstream fluidly from the system pump 12 to drain and to refill the aquarium 6 respectively with fluid pressure provided selectively by the system pump 12. The discharge conveyance 21 and the refill conveyance 24 can be valved with the three-way valving 20 and connected with the quick-joint inlet attachment 3 and the quick-joint outlet attachment 8 respectively as illustrated.

For the horizontally oriented filtering canisters 1 shown in FIG. 3, a shutoff valve 25 in the cannister inlet conveyance 2 and in the cannister outlet conveyance 7 prevent escape of water when the filtering cannister 1 is disconnected at the quick-joint inlet attachment 3 and the quick-joint outlet attachment 8 for cleaning and/or replacement of the filtering members 11.

Referring now to FIGS. 5–17, quick, convenient and yet leakproof, reliable and inexpensive low-pressure and vacuum connections with a selection of the following quick-joint inlet attachments 3 and quick-joint outlet attachment 8 enhance greatly the value and utility of this invention. The quick-joint inlet attachment 3 and the quick-joint outlet attachment 8 are interchangeable and reversible linearly. Description of the quick-joint inlet attachment 3 is description of the quick-joint outlet attachment 8 for a select tubular connection, except for positioning on the aquarium-maintenance system and resulting designation of inlet for inlet-flow connections and outlet for outlet-flow connections. Interchangeableness of inlet and outlet tubular connections includes interchangeableness and combinations of selections of the inlet and outlet tubular connections.

As shown in FIGS. 5–11, a tubular connection having a squeeze release employs a pair of bevel rods 26 that are oppositely disposed collinearly on an inside periphery of a spring cylinder 27 that is release-squeezable manually from circularity to ellipticity. The bevel rods 26 are spring-pressured radially inward to sliding contact of ring-side walls 28 of the bevel rods 26 against a ring washer 29 that buttresses a washer-backed O-ring 30 to force the ring washer 29 and the washer-backed O-ring 30 to travel orthogonally to the bevel rods by spring-resilience travel of a cylindrical wall of the spring cylinder 27 from ellipticity for squeeze-release mode to circularity for sealing mode of the tubular connection selectively.

The washer-backed O-ring 30 is buttressed against circumferentially inside sealing perimeter 31 of a base cylinder 32. A first tube 33 has an outside periphery that is leakproof-affixed, preferably with threading and/or adhesive material, to an inside periphery of a first end of the base cylinder 32. A resilient tube 34 is positioned circumferentially intermediate the inside periphery of the spring cylinder 27 and an outside periphery of the base cylinder 32. The base cylinder 32 has radial slide walls 35 with which sides of the bevel rods 26 have backup-sliding contact intermediate the squeeze-release mode and the sealing mode of the tubular connection. The resilient tube 34 has radial apertures through which the bevel rods 26 are extended inward radially from the spring cylinder 27.

The ring-side walls 28 of the bevel rods 26 have bevels 36 with predetermined bevel angles of preferably less than seven degrees from bevel-rod axisymmetry to bevel-drive the ring washer 29 from oppositely disposed sides against the washer-backed O-ring 30 circumferentially. The washer-backed O-ring 30 is rubberlike sealing material that requires circumferential backing for uniform sealing contact with the inside sealing perimeter 31 of the base cylinder 32 and/or for uniform sealing contact with an outside sealing surface of a second tube 37 having a sealing end proximate the inside sealing perimeter 31 of the base cylinder 32.

The bevel rods 26 have polygonal cross sections with the ring-side walls 28 being parallel to remaining sides for support portions of the bevel rods 26. The ring-side walls 28 have internal ends that are beveled with the bevels 36 to bevel-drive the ring washer 29 axially for forcing the washer-backed O-ring 30 in axially sealing position against the sealing perimeter 31. The internal ends of the beveled rods 26 can have ratchet ends 38 with ratchet-retainment sides that are sized and shaped to buttress against a retainment surface 39 of the second tube 37 to arrest dislodgement of the second tube 37.

As shown in FIGS. 12–14, the tubular connection can have an O-ring-snap-on release with a grasping-seal O-ring 40 having predetermined rubberlike sealing, contractional resilience and size in an O-ring-sleeve groove 41 in an internal periphery of an O-ring sleeve 42. The outside periphery of a joint end of the first tube 33 is leakproof-affixed to an inside periphery of a first end of the O-ring sleeve 42. The inside periphery of the O-ring sleeve 42 has an end-sealing perimeter 43 proximate the joint end of the first tube 33. The second tube 37 has a sealing end with a sealing surface 44 that is sealing-pressured against the end-sealing perimeter 43 of the O-ring sleeve 42 by radially contractional resilience pressure of the grasping-seal O-ring 40 against a seal-pressurization side 45 of a pressurization groove 46 that is proximate the sealing end of the second tube 37.

The sealing end of the second tube 37 has predetermined size and material adaptation for the pressurization groove 46 with predetermined eccentricity to receive a portion of the grasping-seal O-ring 40 that is sufficiently large and contractible to provide adequate contractional pressure to achieve desired sealing at the sealing surface 44 of the sealing end of the second tube 37. Depicted as an option in FIG. 13, at least one tube-handle member 47 can be positioned proximate the sealing end of the second tube 37 to provide grasping of the sealing end of the second tube 37 and the O-ring sleeve 42 for snapping and unsnapping the O-ring-snap-on release.

As shown in FIGS. 15–17, the tubular connection can have a side-spring-snap-on release with a side-pressure coil spring 48 that has predetermined expandable resilience circumferentially from ellipticity in a side-spring groove 49 in an inside periphery of a side-spring sleeve 50. The outside periphery of the joint end of the first tube 33 is leakproof-affixed to an inside periphery of a first end of the side-spring sleeve 50. The inside periphery of the side-spring sleeve 50 has an O-ring-sealing perimeter 51 proximate the leakproof-affixed joint end of the first tube 33. The second tube 37 has a spring-pressure groove 52 with a pressurization wall 53 against which the side-pressure coil spring 48 is spring-pressured circumferentially from ellipticity intermediate the side-spring groove 49 and the pressurization wall 53 of the spring-pressure groove 52 to force a sealing end 54 of the second tube 37 against a spring-pressured O-ring 55 intermediate the O-ring-sealing perimeter 51 of the side-spring sleeve 50 and the sealing end 54 of the second tube 37.

The sealing end 54 of the second tube 37 has predetermined size and material adaptation, such as a metallic of other hard material tip, for the spring-pressure groove 52. At least one tube-handle member 47 can be positioned proximate the sealing end 54 of the second tube 37.

Referring further to FIGS. 1–4, a comprehensive embodiment of this invention is particularly advantageous for commercial, multiple-unit and large aquariums 6 which require filtering cannisters 1 and filtering members 11 which are too cumbersome for convenient handling and replacement cleaning. For such large aquarium applications, cleaning the aquariums 6 separately also can difficult. Either the entire comprehensive embodiment or desired portions of it can be used also for smaller aquariums. Maintenance of an entire aquarium system of any size with this invention can include first, cleaning the filtering cannister 1 with preferably the back-flow washing for large systems or with replacement and-or cleaning of filtering members 11 in order to prepare a supply of clean water for a cleaned or flushed aquarium 6. Then, the aquarium 6 can be flushed by employing the cannister bypass 19 for pumping aquarium water from a full level 56 to a flush level 57 through the discharge conveyance 21. Filling the aquarium 6 afterwards can be accomplished with water from either the refill-water source 23 or the wash-water source 17, which for some situations can be the same source with different conveyances. For salt-water aquariums 6, however, the refill-water source 23 will be a source of salt water and the wash-water source 17 can be a fresh-water source.

For more thorough cleaning of aquariums 6 that are not provided with balanced life forms for self-cleaning, aquatic life must be removed to be replaced after the aquarium 6 and its contents 58 are cleaned. A plurality of aquariums 6 or a divisible aquarium 6 with a removable barrier 59 can be used when transporting and/or herding aquatic life from-place-to-place while a habitat is being refreshed. For herding fish in combination with transporting of such aquatic life as snails and non-swimming aquatic life from-end-to-end of a partitioned aquarium, valved supplemental conveyances 60 shown in dashed lines can be employed.

A new and useful aquarium-maintenance system having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. An aquarium-maintenance system comprising:

an aquarium;

a filtering cannister that is at least partly transparent for visual observation of the cleanliness of aquarium water and the filtering medium in the filtering cannister;

the filtering cannister having a filter portion, a filter-inlet portion and a filter-outlet portion;

a cannister-inlet conveyance having a quick-joint inlet attachment that is in fluid communication intermediate the filter-inlet portion and a drain conveyance that is fluid communicative from at least one aquarium;

the drain conveyance being at least partly transparent for visual observation of cleanness of the aquarium water in the drain conveyance;

a cannister-outlet conveyance having a quick-joint outlet attachment in fluid communication intermediate the filter-outlet portion and a circulator conveyance;

a system pump having predetermined pumping capacity in fluid communication intermediate the circulator conveyance and a fill conveyance that is fluid communicative to the aquarium;

the fill conveyance being at least partly transparent for visual observation of cleanness of the aquarium water in the fill conveyance;

at least one handling member on the filtering cannister; and a filtering cleaner on the filtering cannister;

the quick-joint inlet attachment is a tubular inlet connection;

the quick-joint outlet attachment is a tubular outlet connection;

the tubular inlet connection has a squeeze-release with a pair of bevel rods that are oppositely disposed collinearly on an inside periphery of a release-squeezable spring cylinder with which the bevel rods are spring-pressured radially inward to sliding contact of ring-side walls of the bevel rods against a ring washer that buttresses a washer-backed O-ring to force the ring washer and the washer-backed O-ring to travel orthogonally to the bevel rods by spring-resilience travel of a cylindrical wall of the spring cylinder from ellipticity for squeeze-release mode to circularity for sealing mode of the tubular inlet connection selectively;

the washer-backed O-ring is buttressed against a circumferentially inside sealing perimeter of a base cylinder;

a first tube has an outside periphery that is leakproof-affixed to an inside sealing periphery of a first end of the base cylinder;

a resilient tube is positioned circumferentially intermediate the inside periphery of the spring cylinder and an outside periphery of the base cylinder;

the base cylinder has radial slide walls with which sides of the bevel rods have backup-sliding contact intermediate the squeeze-release mode and the sealing mode of the tubular inlet connection;

the resilient tube has radial apertures through which the bevel rods are extended inward radially from the spring cylinder;

the ring-side walls of the bevel rods have bevels with predetermined bevel angles to bevel-drive the ring washer from oppositely disposed sides against the washer-backed O-ring circumferentially; and the washer-backed O-ring is rubber-like sealing material that has circumferential backing for uniform sealing contact with the inside sealing perimeter of the base of cylinder and for uniform sealing contact with an outside sealing surface of a second tube having a sealing end proximate the inside sealing perimeter of the base cylinder.

2. An aquarium-maintenance system as described in claim 1 wherein:

the bevel rods have polygonal cross sections with the ring-side walls being parallel to remaining sides for support portions of the bevel rods; and the ring-side walls have internal ends that are beveled to bevel-drive the ring washer axially to force the washer-backed O-ring to axially sealing position against the inside sealing perimeter of the base cylinder.

3. An aquarium-maintenance system as described in claim 2 wherein:

the internal ends of the beveled rods have ratchet ends with ratchet-retainment sides of the ratchet ends being sized and shaped to buttress against a retainment surface on the second tube to arrest dislodgement of the second tube.

4. An aquarium-maintenance system as described in claim 1 wherein:

the tubular outlet connection has a squeeze-release with a pair of bevel rods that are oppositely disposed collinearly on an inside periphery of a release-squeezable spring cylinder with which the bevel rods are spring-pressured radially inward to sliding contact of ring-side walls of the bevel rods against a ring washer that buttresses a washer-backed O-ring to force the ring washer and the washer-backed O-ring to travel orthogonally to the bevel rods by spring-resilience travel of a cylindrical wall of the spring cylinder from ellipticity for squeeze-release mode to circularity for sealing mode of the tubular outlet connection selectively;

the washer-backed O-ring is buttressed against a circumferentially inside sealing perimeter of a base cylinder;

a first tube has an outside periphery that is leakproof-affixed to an inside periphery of a first end of the base cylinder;

a resilient tube is positioned circumferentially intermediate the inside periphery of the spring cylinder and an outside periphery of the base cylinder;

the base cylinder has radial slide walls with which sides of the bevel rods have backup-sliding contact intermediate the squeeze-release mode and the sealing mode of the tubular outlet connection;

the resilient tube has radial apertures through which the bevel rods are extended inward radially from the spring cylinder;

the ring-side walls of the bevel rods have bevels with predetermined bevel angles to bevel-drive the ring washer from oppositely disposed sides against the washer-backed O-ring circumferentially; and the washer-backed O-ring is rubber-like sealing material that has circumferential backing for uniform sealing contact with the inside sealing perimeter of the base cylinder and for uniform sealing contact with an outside sealing surface of a second tube having a sealing end proximate the inside sealing perimeter of the base cylinder.

5. An aquarium-maintenance system as described in claim 4 wherein:

the bevel rods have polygonal cross sections with the ring-side walls being parallel to remaining sides for support portions of the bevel rods; and the ring-side walls have internal ends that are beveled to bevel-drive the ring washer axially to force the washer-backed O-ring to axially sealing position against the inside sealing perimeter of the base cylinder.

6. An aquarium-maintenance system as described in claim 5 wherein:

the internal ends of the beveled rods have ratchet ends with ratchet-retainment sides of the ratchet ends being sized and shaped to buttress against a retainment surface on the second tube to arrest dislodgement of the second tube.

* * * * *